US010819810B2

(12) United States Patent
Baughman et al.

(10) Patent No.: US 10,819,810 B2
(45) Date of Patent: Oct. 27, 2020

(54) EVENT AFFINITY DETANGLING WITH BROADCASTS ROLLING OVER TIME ZONES

(71) Applicant: International Business Machines Corporation, Armonk, NY (US)

(72) Inventors: Aaron K. Baughman, Silver Spring, MD (US); Thomas B. Harrison, Holly Springs, NC (US); Nicholas A. McCrory, Sacramento, CA (US); Michelle Welcks, Tampa, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 263 days.

(21) Appl. No.: 15/399,725

(22) Filed: Jan. 5, 2017

(65) Prior Publication Data

US 2018/0191851 A1 Jul. 5, 2018

(51) Int. Cl.

| | |
|---|---|
| ***H04N 21/442*** | (2011.01) |
| ***H04L 29/08*** | (2006.01) |
| ***H04N 21/435*** | (2011.01) |
| ***H04H 60/33*** | (2008.01) |
| ***H04L 12/58*** | (2006.01) |
| ***H04W 4/21*** | (2018.01) |
| *G06Q 50/00* | (2012.01) |

(52) U.S. Cl.

CPC ............ *H04L 67/22* (2013.01); *H04H 60/33* (2013.01); *H04L 51/20* (2013.01); *H04L 51/32* (2013.01); *H04W 4/21* (2018.02); *G06Q 50/01* (2013.01)

(58) Field of Classification Search

CPC ....... H04L 67/22; H04L 43/062; H04L 51/32; H04H 60/33; G06Q 50/01

USPC ........................................................ 709/224

See application file for complete search history.

(56) References Cited

U.S. PATENT DOCUMENTS 4,107,735 A * 8/1978 Frohbach .............. H04H 60/33 348/E7.07
8,856,814 B2 * 10/2014 Parekh .................. H04H 20/38 725/32

(Continued)

OTHER PUBLICATIONS

Appendix P, 2017.

(Continued)

*Primary Examiner* — Kevin T Bates
*Assistant Examiner* — Golam Mahmud
(74) *Attorney, Agent, or Firm* — Garg Law Firm, PLLC; Rakesh Garg; James Nock

(57) ABSTRACT

Social media inputs specific to a content of a broadcast program and received from a plurality of users are analyzed to determine a sentiment value expressed relative to a portion of the content. A group is formed of those users whose sentiment values expressed relative to the portion of the content are within a specified tolerance value of sentiment value and are expressed within a defined period during the broadcast of the program. A historical data from the inputs unrelated to the content is analyzed to extract an entity. A time zone of a geographical location of the entity is associated with the group. a sentiment of the group expressed relative to the portion of the content is shifted by an amount of time on a program continuum timeline, such that the sentiment of the group aligns with a time when the portion was broadcast in the time zone.

17 Claims, 5 Drawing Sheets

(56) References Cited

U.S. PATENT DOCUMENTS 8,892,458 B2 * 11/2014 Christensen .......... H04H 60/37 705/14.55
9,053,497 B2 * 6/2015 Benyamin .......... G06Q 30/0269
9,124,774 B2 * 9/2015 Xu .................... H04N 7/17327
9,298,782 B2 3/2016 Skrenta et al.
9,354,778 B2 5/2016 Cornaby et al.
9,497,420 B2 * 11/2016 Jeong ................ G06Q 30/0601
9,883,233 B1 * 1/2018 Barton .................. H04H 60/46
2009/0164516 A1 * 6/2009 Svendsen ............... H04L 67/22
2009/0271524 A1 10/2009 Davi et al.
2012/0215903 A1 * 8/2012 Fleischman ........... G06Q 50/01 709/224
2014/0173642 A1 6/2014 Vinson et al.
2014/0280564 A1 9/2014 Darling et al.
2015/0026308 A1 * 1/2015 MacTiernan ..... H04N 21/25891 709/219
2015/0186774 A1 * 7/2015 Albouyeh .............. H04L 67/22 706/46
2015/0310507 A1 * 10/2015 Woodward ............. H04L 51/04 705/329
2016/0007083 A1 * 1/2016 Gurha ................. H04N 21/252 725/13
2016/0014477 A1 * 1/2016 Siders ............... H04N 21/8133 725/32
2016/0246801 A1 * 8/2016 Fleischman .......... G06F 3/0484

OTHER PUBLICATIONS

March; Determinants Affecting Organizations' Intent to Adopt E-tailing: A Study Based on Innovation Theories, ITICSE'04, Jun. 28-30, 2004, Leeds, United Kingdom.

Minemmi et al; I know what you did last summer: an investigation of how developers spend their time, 2015 IEEE 23rd International Conference on Program Comprehension.

Dhar et al; Performance analysis of a new fast negative sequence power injection oriented islanding detection technique for photovoltaic photovoltaic based voltage source converter based micro grid operation, IET Gener. Transm. Distrib., 2015, vol. 9, Iss. 15, pp. 2079-2090, The Institution of Engineering and Technology 2015.

Teague et al; Novel Methods for Sensing Acoustical Emissions From the Knee for Wearable Joint Health Assessment, IEEE Transactions on Biomedical Engineering, vol. 63, No. 8, Aug. 2016.

List of IBM related applications, Appendix P, 2018.

* cited by examiner

100
APPLICATION 105
SERVER 104
STORAGE 108
NETWORK 102
SOCIAL MEDIA DATA SOURCE 107
SERVER 106
TIME ZONE n
CLIENT 114
CLIENT 110
TIME ZONE 1
DEVICE 132
CLIENT 112
TIME ZONE 2
144A
144B
144C
ROLLING BROADCAST ACROSS TIME ZONES
BROAD-CASTER 142

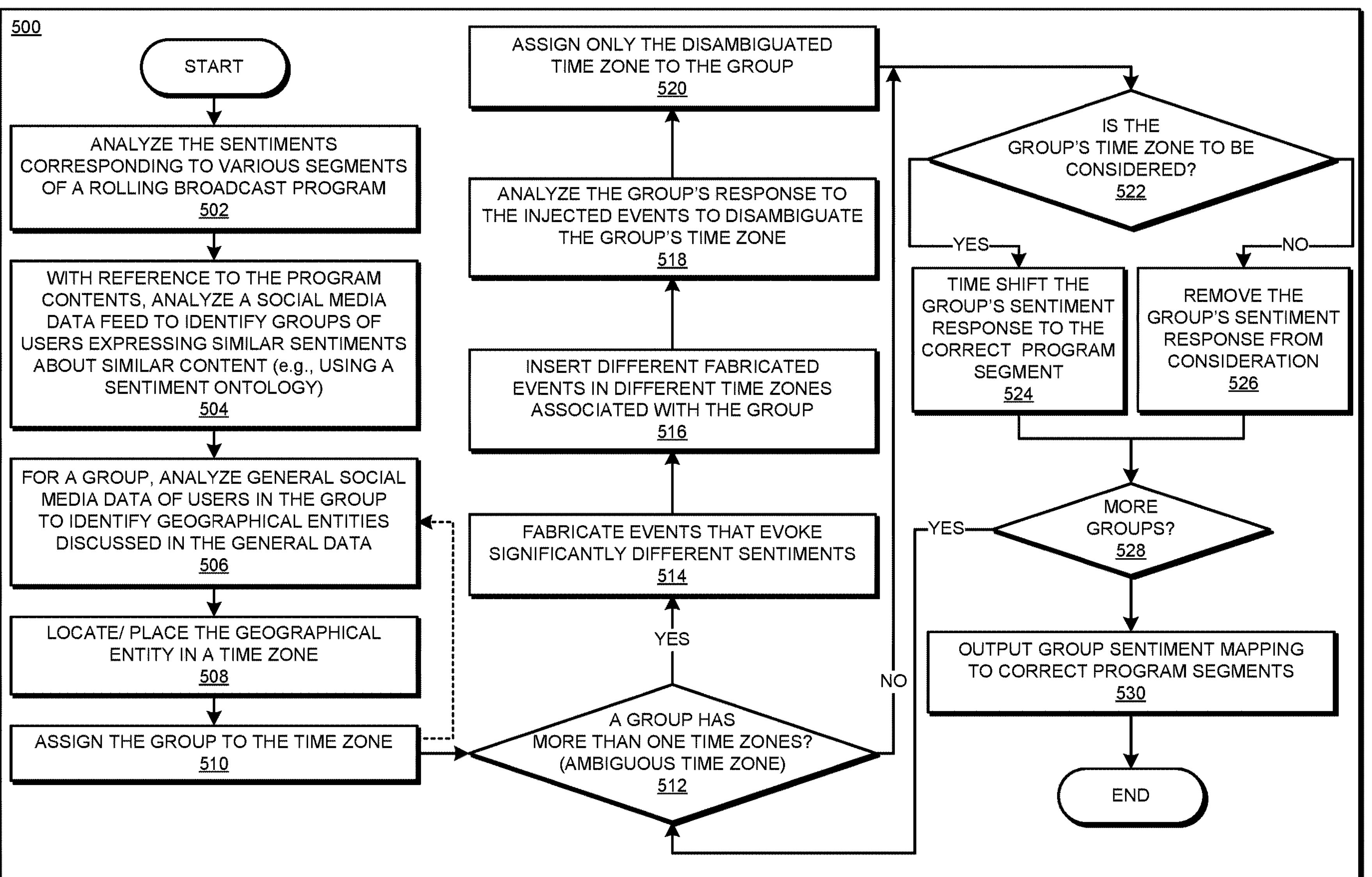
FIGURE 5
500
START
ANALYZE THE SENTIMENTS CORRESPONDING TO VARIOUS SEGMENTS OF A ROLLING BROADCAST PROGRAM 502
WITH REFERENCE TO THE PROGRAM CONTENTS, ANALYZE A SOCIAL MEDIA DATA FEED TO IDENTIFY GROUPS OF USERS EXPRESSING SIMILAR SENTIMENTS ABOUT SIMILAR CONTENT (e.g., USING A SENTIMENT ONTOLOGY) 504
FOR A GROUP, ANALYZE GENERAL SOCIAL MEDIA DATA OF USERS IN THE GROUP TO IDENTIFY GEOGRAPHICAL ENTITIES DISCUSSED IN THE GENERAL DATA 506
LOCATE/ PLACE THE GEOGRAPHICAL ENTITY IN A TIME ZONE 508
ASSIGN THE GROUP TO THE TIME ZONE 510
A GROUP HAS MORE THAN ONE TIME ZONES? (AMBIGUOUS TIME ZONE) 512
YES
NO
FABRICATE EVENTS THAT EVOKE SIGNIFICANTLY DIFFERENT SENTIMENTS 514
INSERT DIFFERENT FABRICATED EVENTS IN DIFFERENT TIME ZONES ASSOCIATED WITH THE GROUP 516
ANALYZE THE GROUP'S RESPONSE TO THE INJECTED EVENTS TO DISAMBIGUATE THE GROUP'S TIME ZONE 518
ASSIGN ONLY THE DISAMBIGUATED TIME ZONE TO THE GROUP 520
IS THE GROUP'S TIME ZONE TO BE CONSIDERED? 522
YES
NO
TIME SHIFT THE GROUP'S SENTIMENT RESPONSE TO THE CORRECT PROGRAM SEGMENT 524
REMOVE THE GROUP'S SENTIMENT RESPONSE FROM CONSIDERATION 526
MORE GROUPS? 528
YES
OUTPUT GROUP SENTIMENT MAPPING TO CORRECT PROGRAM SEGMENTS 530
END

EVENT AFFINITY DETANGLING WITH BROADCASTS ROLLING OVER TIME ZONES

TECHNICAL FIELD

The present invention relates generally to a method, system, and computer program product for accurately measuring sentiment response to broadcast programming from users in different time zones. More particularly, the present invention relates to a method, system, and computer program product for event affinity detangling with broadcasts rolling over time zones.

BACKGROUND

Hereinafter, content disseminated via any broadcasting medium is interchangeably referred to as simply "broadcast," "program," or "broadcast program" unless expressly disambiguated where used. A time zone refers to a geographic region that maintains and observes the same standard time across that region.

A broadcast is said to roll over time zones when the same broadcast is initiated at different times relative to Zulu time in different time zones. Greenwich Mean Time (GMT) is also referred to as Zulu time or Coordinated Universal Time (French: Temps universel coordonné), abbreviated as UTC.

For example, a televised program may roll over the time zones of the continental United States when the program is broadcast at 8:00 PM in each time zone. That is, the program may be broadcast at 8 PM in Eastern Standard Time which is UTC minus 5 hours, at 8 PM in Central Standard Time which is UTC minus 6 hours, at 8 PM in Mountain Standard Time which is UTC minus 7 hours, and so on.

Analysis of the sentiments expressed by the users who receive the program is an important consideration in the broadcasting industry. Whether a program or a portion thereof has evoked a desired sentiment, to a desired degree, or both, is a key factor in determining the content selection, the broadcast timing, the selection of time zones where the broadcast will occur, the selection of times in various time zones when the broadcast will occur there, and many other factors.

SUMMARY

The illustrative embodiments provide a method, system, and computer program product. An embodiment includes a method that analyzes social media inputs (inputs) from a plurality of users, wherein the inputs are specific to a content of a broadcast program, the analyzing determining a sentiment value expressed relative to a portion of the content by a user in the plurality of users. The embodiment forms a group of those users whose sentiment values expressed relative to the portion of the content are within a specified tolerance value of sentiment value expressed by the user, wherein the sentiment values of the group of users are expressed within a defined period during the broadcast of the program, the group of users including the user. The embodiment analyzes a historical data from the inputs to extract an entity, wherein the historical data is unrelated to the content. The embodiment associates a time zone of a geographical location of the entity with the group. The embodiment shifts, by an amount of time on a program continuum timeline, a sentiment of the group expressed relative to the portion of the content such that the sentiment of the group aligns with a time when the portion was broadcast in the time zone. The embodiment outputs a sentiment analysis report of the broadcast program, the report comprising time-shifted sentiment values of a plurality of groups, wherein the plurality of groups is scattered across a plurality of time zones, and wherein the broadcast begins at different times relative to Zulu time in different time zones in a rolling manner.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a flowchart of an example process for event affinity detangling with broadcasts rolling over time zones in accordance with an illustrative embodiment.

DETAILED DESCRIPTION

Figure 1:
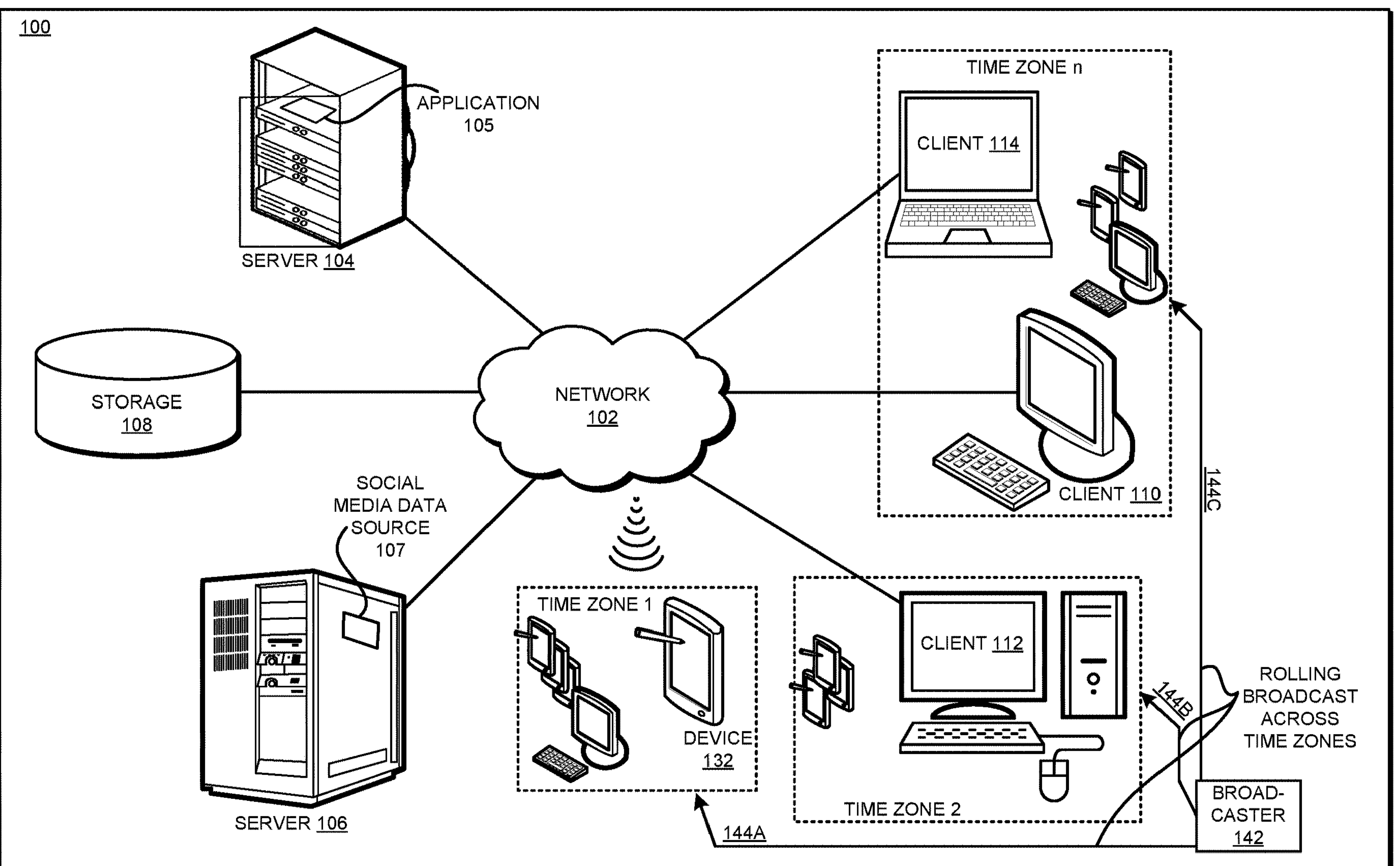
FIG. 1 depicts a block diagram of a network of data processing systems in which illustrative embodiments may be implemented.

The illustrative embodiments recognize that due to the rolling nature of many types of broadcast programming, different groups of users, who are located in different time zones receive the program content at different times. The users react to the program content on social media. At any given time, different segments of the program may be broadcast in different time zones. Therefore, at any given time, the sentiments expressed by different user groups in different time zones are in response to different program segments.

For example, assume that in an overly simplified example scenario, a program has a first segment that evokes happy sentiments and a second segment that evokes sad sentiments. Further assume that the broadcast of the program rolls over two time zones such that at time T, the first segment is broadcasting in the second time zone and the broadcast in the first time zone has already moved on to the second segment. At time T, the sentiment value expressed in social media data by the users in the first time zone will be generally indicative of a sad sentiment, whereas the sentiment value expressed in social media data by the users in the second time zone will be generally indicative of a happy sentiment. Thus, at time T, the sentiment response to the program is muddled, ambiguous, unclear, when the time zones of the reacting users cannot be reliably established.

As a specific example, it is well-known that the television coverage of the Olympic games was broadcast in almost every time zone in the world. The Olympics broadcast scrambled event schedules dramatically. In some cases, the broadcast carried the content of live events, which was broadcast at very inconvenient times in some time zones. Some broadcasters therefore elected to broadcast recorded content from those events at prime time in the time zones where the broadcaster provided service. For example, American networks showed events many hours after they happened, and often saved the most popular events for prime time regardless of when they actually happened. The broadcast of any particular event had very little relevance to when the event actually occurred. Thus, the illustrative embodiments recognize that anyone watching an event and commenting about it on social media would either have their sentiment mixed with fans around the world who either had seen the event already, or might be complaining about spoilers because they had not seen the event yet.

Generally, the illustrative embodiments recognize that interpreting an event's popularity or affinity is challenging given entangled pseudo independent variables of the users' sentiment response to the event. This challenge is complicated even further when events are broadcast in a time delayed fashion across multiple time zones. As in an example described earlier, social sentiment from viewers on the East coast is recorded first, but when other time zones "light up" after the first hour of the broadcast the sentiment from viewers across multiple time zones becomes muddled with the reactions to what is being broadcast in other time zones. For instance, viewers watching a tribute for a lifetime achievement award that is being broadcast at the top of hour two on the East Coast will have a very different social sentiment than viewers watching the opening ceremony that is being broadcast in the Central Time Zone but these reactions will register on social media at the same time.

Thus, the illustrative embodiments recognize that when monitoring the social sentiment for live events that are being televised on a time delay per time zone adjustments need to be made to detangle sentiment per time zone. The illustrative embodiments further recognize that while location information is sometimes associated with social media inputs of users, such information is not always available or reliable. Thus, the illustrative embodiments recognize that relying upon the location information associated social media data to filter user sentiments according to time zones is unreliable. A solution is needed to untangle the entangled sentiments created on social media due to the rolling broadcast times, without relying upon the presence or accuracy of location information in the social media data.

The illustrative embodiments recognize that the presently available tools or solutions do not address these needs or provide adequate solutions for these needs. The illustrative embodiments used to describe the invention generally address and solve the above-described problems and other problems related to event affinity detangling with broadcasts rolling over time zones.

An embodiment can be implemented as a software application. The application implementing an embodiment can be configured as a modification of an existing social media data analysis system, as a separate application that operates in conjunction with an existing social media data analysis system, a standalone application, or some combination thereof.

An embodiment determines or creates a set of segments of the content of a program that is broadcast in a rolling manner over several time zones. For a segment, the embodiment determines a type of sentiment, a degree of that type of sentiment a timing of that sentiment within the segment, or some combination thereof. The type, degree, timing, or some combination thereof can be represented in a value or set of values.

An embodiment receives a social media data feed (hereinafter referred to as "feed" or "social data" for compactness). The feed includes social media inputs—such as tweets, posts, comments, likes, dislikes, and other similarly purposed inputs—from a plurality of users. The plurality of users is scattered across different time zones. Furthermore, the embodiment ignores, or otherwise refrains from relying upon any location data that may be associated with any particular input of any particular user within the feed.

From the feed, the embodiment analyzes the inputs pertaining to the broadcast. Particularly, the embodiment analyzes the sentiments expressed by the users relative to the program.

In one embodiment, a sentiment ontology can be used to determine the sentiment value or values associated with a user's input relative to the program. An example sentiment ontology may include a node indicative of a social tone characteristic, which may have child nodes comprising social propensity, language style, and emotion sub-characteristics. The example sentiment ontology may include another node indicative of a social sentiment characteristic, which may have child nodes comprising positive, negative, and neutral sub-characteristics.

These examples of a sentiment ontology and the nodes therein are not intended to be limiting. From this disclosure, those of ordinary skill in the art will be able to conceive many other nodes that may be present in a more complex or different sentiment ontology, and the same are contemplated within the scope of the illustrative embodiments.

An embodiment groups those users into a group who are expressing similar sentiments about similar content of the program at approximately the same time (i.e., during a specified period). In other words, the embodiment forms groups of users where a group has a sentiment value within a tolerance of a threshold sentiment value, related to a portion of the program, where that sentiment value is expressed within a specified period in the feed. The grouping implies that the users in a given group are all consuming the same content segment and responding to that content segment with sentiments in social media.

An embodiment attempts to place a group in a time zone. In other words, the embodiment performs further operations to assign a time zone to a group. To place a group in a time zone, the embodiment analyzes other social data—non-program content-specific social data—of one or more users in the group. For example, a user in the group may have been tweeting about a mountain hiking activity that the user engages in on a regular basis. The analysis performed by the embodiment identifies one or more geographical references, features, objects, regions, people, or things (commonly referred to as "entities") that commonly and historically feature in the non-program content-specific social data of the user or users in the group. The social data of any number of users of a group can be analyzed in this manner.

Using proprietary knowledge repositories or commonly available data sources, an embodiment determines a geographical location that is known to be associated with an identified entity. The embodiment then assigns the group the time zone of that determined geographical location. For example, if several users of a group have commented on a marathon crossing over the Golden Gate bridge—an example entity—on a particularly windy day, and knowing that the Golden gate bridge is in San Francisco, Calif., the embodiment would place that group in the Pacific time zone.

While for a majority of the groups, an embodiment is able to place a group in a singular time zone with a requisite degree of certainty, in many cases the analyses described herein do not succeed in identifying a singular time zone for a group with sufficient degree of certainty. For example, it may be possible that some members of the group are traveling to different time zones and causing entities from different time zones to occur with enough frequency or numerosity in the social data that the described analysis cannot associate a singular time zone with the group. Such a group is referred to herein as an ambiguous time zone group.

It is possible that an ambiguous time zone group may have two, three, or more time zones where the group could possibly be located. Suppose an embodiment has identified n possible time zones for the ambiguous time zone group. The embodiment fabricates n distinct events that can be broadcast to the n possible time zones—one distinct fabricated event per possible time zone. Furthermore, the embodiment fabricates the n events such that their respective contents evoke significantly distinct sentiments. For example, if two events were fabricated, one could be a happy event—evoking a sentiment value corresponding to a requisite degree of happiness sentiment, such as the news of a victory of a local favorite team; and another could be a sad event—evoking a sentiment value corresponding to a requisite degree of sad sentiment, such as a picture or video of the death of a pet animal. Any number of distinct events evoking distinct sentiment values can be fabricated in a similar manner.

The embodiment injects different fabricated events into the broadcasting in the different possible time zones where the group is likely to be placed. When the members of the group respond to the injected fabricated event, the embodiment measures the sentiment value, e.g., the type and/or the degree of sentiment, in the response. Because each event is distinct, and because each distinct event has a distinct sentiment signature (combination of sentiment values), the measured sentiment value from the group in response to the injected event is likely to have a significant correspondence to only one of the injected events.

Depending upon the injected event that most closely corresponds to the measured sentiment response to the injection, the embodiment isolates the time zone where that particular event was injected. The embodiment disambiguates the ambiguous time zone of the group and associates the group with only the isolated time zone.

The dispersion of the users can be across time zones such that some time zones are irrelevant for determining the response to certain programs. For example, while the Olympic games may be broadcast in fifteen time zones, a broadcaster in the United States may only be interested in the response from the six US time zones and not from the remaining nine time zones outside the US.

Accordingly, an embodiment further determines whether groups from a certain time zone are to be considered in the response analysis for a given program content. If a time zone is not to be considered, the embodiment removes the groups that are placed in that time zone from further response analysis.

For the remaining groups in the time zones that are to be considered, the embodiment now has associated with each such group a single time zone with sufficient degree of certainty. In an analysis described earlier herein, the sentiment value or values of some user responses corresponding to some program content were determined. The embodiment computes a sentiment value/values/signature of the group using the sentiment values expressed by the members of the group.

The embodiment time-shifts the determined sentiment value/values/signature of the group to the correct time zone. In other words, using the time zone of the group, the embodiment aligns the sentiment value of the group with the correct segment of the program that was being broadcast in that time zone when the sentiments were expressed. Thus, the embodiment untangles the entangled sentiment responses of the users from different time zones to programming that is broadcast in a rolling manner across different time zones.

The manner of event affinity detangling with broadcasts rolling over time zones described herein is unavailable in the presently available methods. A method of an embodiment described herein, when implemented to execute on a device or data processing system, comprises substantial advancement of the functionality of that device or data processing system in untangling the entangled sentiment responses of the users from different time zones to programming that is broadcast in a rolling manner across different time zones.

The illustrative embodiments are described with respect to certain types of programs, contents, segments, broadcasts, time zone, users, groups, social media, social media inputs, feeds, entities, fabricated events, sentiments, sentiment values, sentiment signature, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
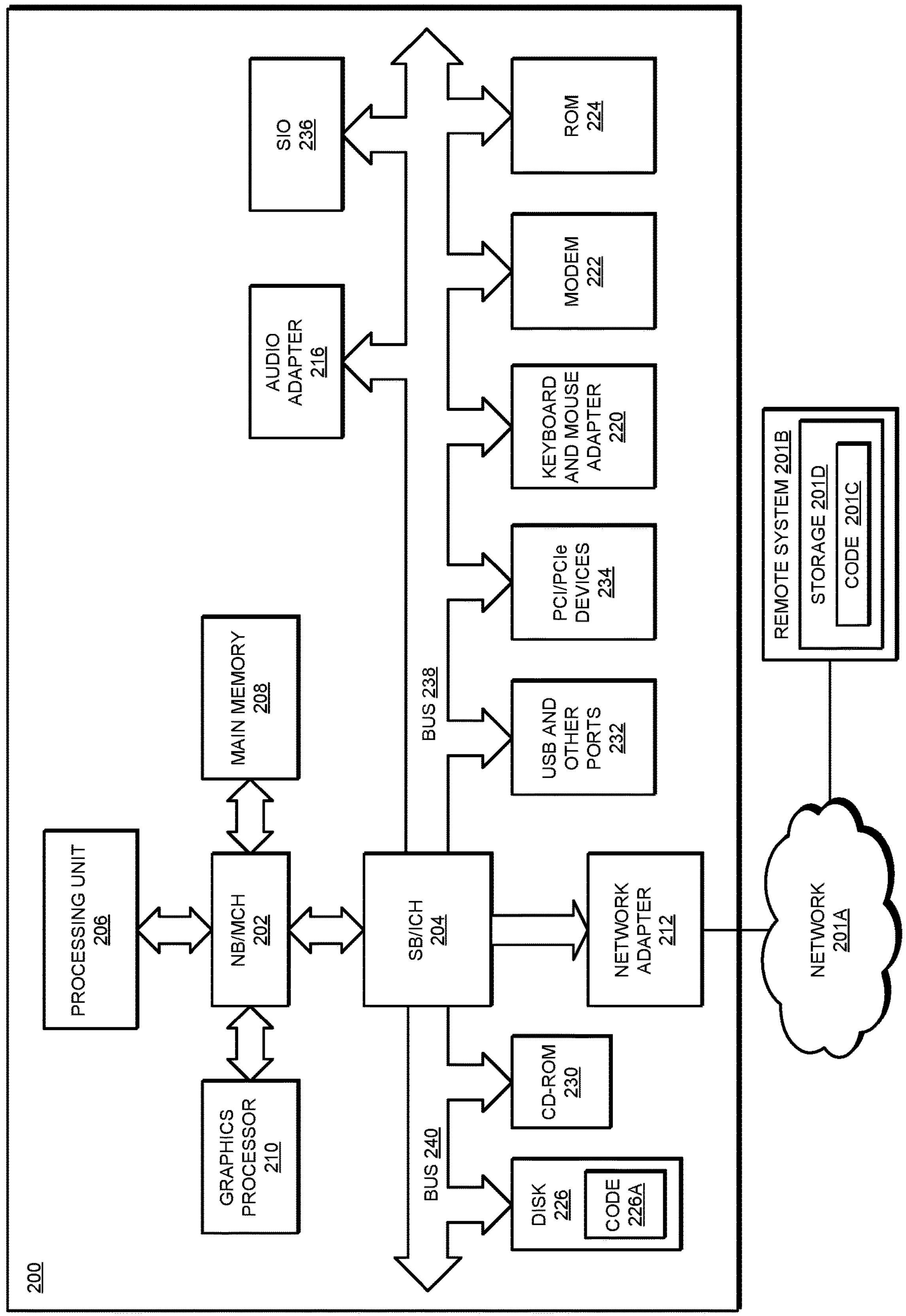
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Social media data source 107 supplies a social media data feed to application 105 for the operations described herein. Broadcaster 142 broadcasts a program content in a rolling manner across several time zones. For example, at a given time T, broadcaster 142 sends segment 144A to time zone 1 in which device 132 associated with a user, and other devices associated with other users are present; broadcaster 142 sends segment 144B to time zone 2 in which device client 112 associated with a user, and other devices associated with other users are present; and broadcaster 142 sends segment 144C to time zone n in which client 110 associated with one user, client 114 associated with another user, and other devices associated with other users are present. Device 132, clients 110-114 are some non-limiting examples of devices that users use to provide social media reaction inputs, which form the feed provided by data source 107.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
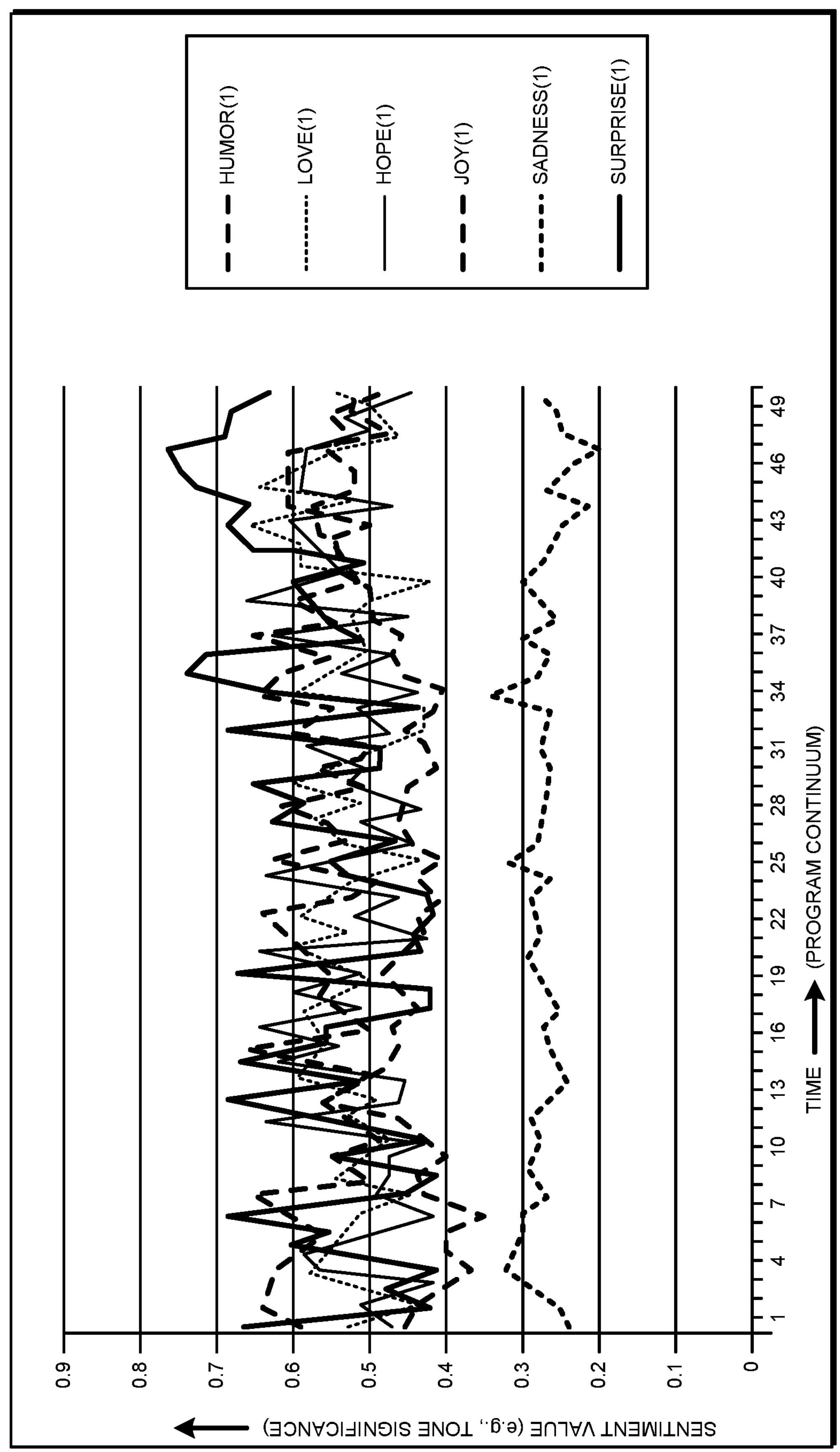
FIG. 3 depicts a graph of entangled sentiments across time zones, which can be untangled with an illustrative embodiment.

With reference to FIG. 3, this figure depicts a graph of entangled sentiments across time zones, which can be untangled with an illustrative embodiment. Graph 300 is plotted with a timeline of a program continuum along the X-axis and an example measured normalized sentiment value, e.g., tone significance, plotted along the y-axis. Legend 302 shows the various sentiments represented in graph 300.

Different segments of the program continuum are broadcast in different time zones at any given time, as described herein. The different segments may evoke different sentiments. However, looking at graph 300, it is difficult to determine which sentiment corresponds to which segment of the program continuum. For example, it is likely in a rolling broadcast that the peak in surprise at time 13 is really a surprise corresponding to a program segment at time 1, which is just starting to broadcast in a delayed time zone and the peak in hope sentiment at about the same time corresponds to a segment at time 13 in first time zone where the broadcast started.

Figure 4:
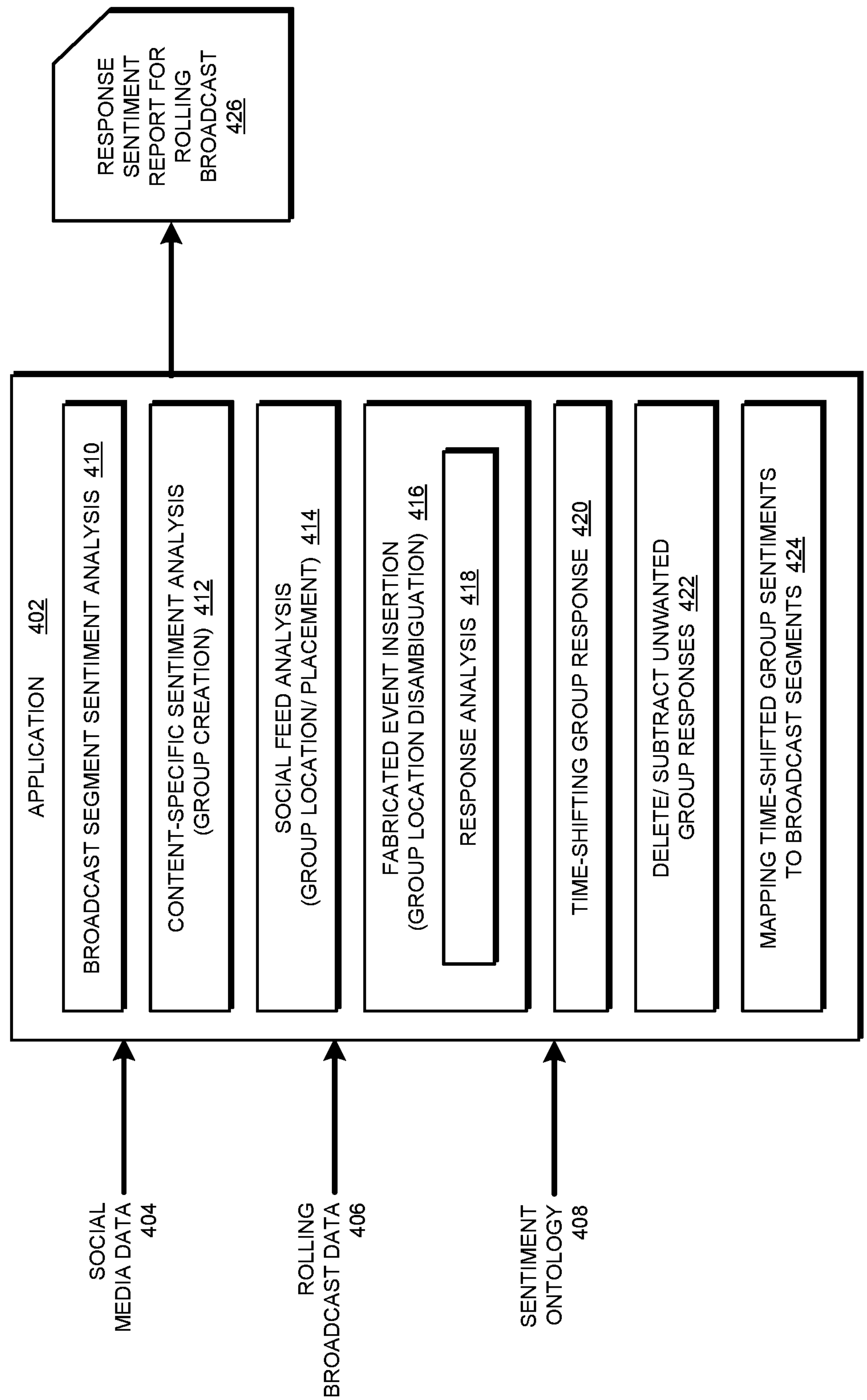
FIG. 4 depicts a block diagram of an example application for event affinity detangling with broadcasts rolling over time zones in accordance with an illustrative embodiment.

With reference to FIG. 4, this figure depicts a block diagram of an example application for event affinity detangling with broadcasts rolling over time zones in accordance with an illustrative embodiment. Application 402 is an example of application 105 in FIG. 1. Social media data 404 is a feed provided from social media data source 107 in FIG. 1. Rolling broadcast data 406 is provided by broadcaster 142 in FIG. 1 and includes information such as program timeline, program content, segments, program metadata, and related information. Sentiment ontology is an example ontology configured and usable for assessing a user's sentiment in response to a program content.

Component 410 analyzes the program content from rolling broadcast data 406 to determine the sentiments evoked by the program content. Particularly, component 410 analyzes the program content for determining the values corresponding to sentiment type, degree, timing, or some combination thereof, (i.e., sentiment signature), corresponding to the various segments of the program content.

Component 412 creates groups of users as described herein. Particularly, component 412 analyzes social media data 404 to determine sentiments corresponding to program content from rolling broadcast data 406 being broadcast. Using the content-specific sentiments, component 412 creates groups of those users who are expressing similar sentiments relative to similar content during a common period.

Using non-program content-specific data from the historical data in social media data feed 404, component 414 extracts entities being commonly discussed by the users of a group, as described herein. Using an entity and the entity's known locations, component 414 places the group by assigning the group the time zone of the location of the entity.

For an ambiguous time zone group, component 416 fabricates a set of distinct events, which evoke distinct sentiments, and inserts the events into the broadcasts in the time zones of the ambiguous time zone group, as described herein. Subcomponent 418 analyzes the sentiment response to the insertions from the live data in social media data feed 404. For example, subcomponent 418 uses content-specific sentiment analysis of component 412 to determine the expressed sentiment and the fabricated event to which the sentiment best corresponds.

component 420 computes the sentiment response for the group as a whole. Once each group has a singular time zone associated with the group, component 420 selects those groups that are to be considered in the sentiment analysis for the program, and time-shifts the sentiment response of the selected groups according to their respective time zones. Component 422 deletes or otherwise drops from consideration those groups that in the time zones that are not to be considered in the sentiment analysis for the program.

Component 424 maps the time-shifted group sentiment of a group to the correct program segment that was broadcast in the time zone of the group during the period of the sentiment. Component 424 outputs report 426. Report 426 provides untangled social media sentiment responses of user groups in various time zones where the program was broadcast in a rolling manner.

With reference to FIG. 5, this figure depicts a flowchart of an example process for event affinity detangling with broadcasts rolling over time zones in accordance with an illustrative embodiment. Process 500 can be implemented in application 402 in FIG. 4.

The application analyzes the sentiments corresponding to various segments of a rolling broadcast program (block 502). With reference to the program contents, the application analyzes content-specific data in a social media data feed to identify groups of users expressing similar sentiments about the same or similar content during a common period of reactions (block 504). The analysis of block 504 uses a sentiment ontology to evaluate the values of the sentiments expressed by the users.

For a group, the application analyzes non-program content-specific historical data from the social media data feed to identify an entity whose geographic location is known (block 506). Once the entity is identified, the application locates or places the entity in a time zone corresponding to the geographical location of the entity (block 508). The application places the group in the time zone of the entity (block 510). The application repeats block 506-510 for as many groups as may have been created in block 504.

The application determines whether a group has more than one time zone associated with the group, i.e., whether any of the groups is an ambiguous time zone group (block 512). If no group is an ambiguous time zone group ("No" path of block 512), the application proceeds to block 522.

If a group is an ambiguous time zone group ("Yes" path of block 512), the application fabricates a number of events equal to the number of time zones of the ambiguous time zone group, such that each fabricated event evokes a different sentiment (block 514). The application inserts different fabricated events into the broadcast occurring in the different time zones associated with the ambiguous time zone group (block 516).

The application analyzes the group's sentiment in response to the injected events, to disambiguate the group to a single time zone (block 518). The application assigns to the group only the disambiguated time zone (block 520).

The application determines whether the group's time zone is to be considered in the sentiment analysis for the program (block 522). If the time zone is to be considered ("Yes" path of block 522), the application time-shifts the group's sentiment to the correct program segment that was being broadcast in that time zone at the time of the response (block 524). If the time zone is not to be considered ("No" path of block 522), the application removes or otherwise disregards the group from consideration (block 526).

The application determines whether more groups are to processed in this manner (block 528). If more groups are to be processed ("Yes" path go block 528), the application returns process 500 to block 512 to select another group. If no more groups are to be processed ("No" path go block 528), the application outputs a mapping of groups' sentiments to the correct program segments (block 530). The application ends process 500 thereafter.

Thus, a computer implemented method, system or apparatus, and computer program product are provided in the illustrative embodiments for event affinity detangling with broadcasts rolling over time zones and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

analyzing social media inputs from a plurality of users, wherein the social media inputs are specific to a content of a broadcast program, wherein the broadcast begins at different times relative to Zulu time in different time zones in a rolling manner, the analyzing determining, using a sentiment ontology, a sentiment value expressed relative to a segment of the content by a user in the plurality of users, the segment being broadcast at different times relative to Zulu time in different time zones;

forming a group of those users whose sentiment values expressed relative to the segment of the content are within a specified tolerance value of sentiment value expressed by the user, wherein the sentiment values of the group of users are expressed within a defined period during the broadcast of the program, the group of users including the user;

analyzing a content of historical social media inputs from the plurality of users to extract an entity, the entity comprising a subject of the historical content, wherein the historical content is unrelated to the content;

associating a time zone of a geographical location of the entity with the group of users;

shifting, by an amount of time on a program continuum timeline, a sentiment of the group of users expressed relative to the segment of the content such that the sentiment of the group of users aligns with a time when the segment was broadcast in the time zone;

outputting a sentiment analysis report of the broadcast program, the report comprising the time-shifted sentiment of the group of users and a second time-shifted sentiment of a second group of users associated with a second time zone, the second time-shifted sentiment aligned with a second time when the segment was broadcast in the second time zone;

determining that the group corresponds to a plurality of time zones because the analyzing the historical data extracts a plurality of entities corresponding to the plurality of time zones;

fabricating event contents corresponding to a plurality of events, each event corresponding to a time zone in the plurality of time zones of the group, and each event evoking a different sentiment value from the users in the group;

inserting in a first broadcast occurring in a first time zone of the group a first event content corresponding to a first event from the plurality of events;

inserting in a second broadcast occurring in a second time zone of the group a second event content corresponding to a second event from the plurality of events;

evaluating a new sentiment expressed in the social media inputs from the users in the group to determine that the new sentiment corresponds to a sentiment evoked by the first event;

disambiguating, responsive to the evaluating, the group to correspond to only the first time zone.

2. The method of claim 1, further comprising:

computing the sentiment of the group by applying a function to the sentiment values expressed by the users in the group relative to the segment of the content.

3. The method of claim 1, further comprising:

forming a second group of those users whose sentiment values expressed relative to a second segment of the content are within a specified tolerance value of each other, wherein the sentiment values of the group of users are expressed within a second defined period during the broadcast of the program;

associating a second time zone of a second geographical location of a second entity with the second group;

dropping from consideration, responsive to the second time zone not being used in the sentiment analysis report of the broadcast program, a second sentiment of the second group expressed relative to the second segment, wherein the shifting is responsive to the time zone being used in the sentiment analysis report of the broadcast program.

4. The method of claim 1, wherein the entity comprises one of (i) an object known to be present at the geographical location and (ii) an event known to have occurred at the location.

5. The method of claim 1, further comprising:

segmenting a content of a broadcast program into a plurality of segments, wherein a first segment comprises an amount of the content up to a point in the content that will have been broadcast in the time zone before broadcast in another time zone reaches the point in the content, the segment being the first segment.

6. A computer usable program product comprising one or more computer-readable storage devices, and program instructions stored on at least one of the one or more storage devices, the stored program instructions comprising:

program instructions to analyze social media inputs from a plurality of users, wherein the social media inputs are specific to a content of a broadcast program, wherein the broadcast begins at different times relative to Zulu time in different time zones in a rolling manner, the analyzing determining, using a sentiment ontology, a sentiment value expressed relative to a segment of the content by a user in the plurality of users, the segment being broadcast at different times relative to Zulu time in different time zones;

program instructions to form a group of those users whose sentiment values expressed relative to the segment of the content are within a specified tolerance value of sentiment value expressed by the user, wherein the sentiment values of the group of users are expressed within a defined period during the broadcast of the program, the group of users including the user;

program instructions to analyze a historical content of historical social media inputs from the plurality of users to extract an entity, the entity comprising a subject of the historical content, wherein the historical content is unrelated to the content;

program instructions to associate a time zone of a geographical location of the entity with the group of users;

program instructions to shift, by an amount of time on a program continuum timeline, a sentiment of the group of users expressed relative to the segment of the content such that the sentiment of the group of users aligns with a time when the segment was broadcast in the time zone;

program instructions to output a sentiment analysis report of the broadcast program, the report comprising the time-shifted sentiment of the group of users and a second time-shifted sentiment of a second group of users associated with a second time zone, the second time-shifted sentiment aligned with a second time when the segment was broadcast in the second time zone;

program instructions to determine that the group corresponds to a plurality of time zones because the analyzing the historical data extracts a plurality of entities corresponding to the plurality of time zones;

program instructions to fabricate event contents corresponding to a plurality of events, each event corresponding to a time zone in the plurality of time zones of the group, and each event evoking a different sentiment value from the users in the group;

program instructions to insert in a first broadcast occurring in a first time zone of the group a first event content corresponding to a first event from the plurality of events;

program instructions to insert in a second broadcast occurring in a second time zone of the group a second event content corresponding to a second event from the plurality of events;

program instructions to evaluate a new sentiment expressed in the social media inputs from the users in the group to determine that the new sentiment corresponds to a sentiment evoked by the first event;

program instructions to disambiguate, responsive to the evaluating, the group to correspond to only the first time zone.

7. The computer usable program product of claim 6, further comprising:

program instructions to compute the sentiment of the group by applying a function to the sentiment values expressed by the users in the group relative to the segment of the content.

8. The computer usable program product of claim 6, further comprising:

program instructions to form a second group of those users whose sentiment values expressed relative to a second segment of the content are within a specified tolerance value of each other, wherein the sentiment values of the group of users are expressed within a second defined period during the broadcast of the program;

program instructions to associate a second time zone of a second geographical location of a second entity with the second group;

program instructions to drop from consideration, responsive to the second time zone not being used in the sentiment analysis report of the broadcast program, a second sentiment of the second group expressed relative to the second segment, wherein the shifting is responsive to the time zone being used in the sentiment analysis report of the broadcast program.

9. The computer usable program product of claim 6, wherein the entity comprises one of (i) an object known to be present at the geographical location and (ii) an event known to have occurred at the location.

10. The computer usable program product of claim 6, further comprising:

program instructions to perform segmenting a content of a broadcast program into a plurality of segments, wherein a first segment comprises an amount of the content up to a point in the content that will have been broadcast in the time zone before broadcast in another time zone reaches the point in the content, the segment being the first segment.

11. The computer usable program product of claim 6, wherein the computer usable code is stored in a computer readable storage device in a data processing system, and wherein the computer usable code is transferred over a network from a remote data processing system.

12. The computer usable program product of claim 6, wherein the computer usable code is stored in a computer readable storage device in a server data processing system, and wherein the computer usable code is downloaded over a network to a remote data processing system for use in a computer readable storage device associated with the remote data processing system.

13. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to analyze social media inputs from a plurality of users, wherein the social media inputs are specific to a content of a broadcast program, wherein the broadcast begins at different times relative to Zulu time in different time zones in a rolling manner, the analyzing determining, using a sentiment ontology, a sentiment value expressed relative to a segment of the content by a user in the plurality of users, the segment being broadcast at different times relative to Zulu time in different time zones;

program instructions to form a group of those users whose sentiment values expressed relative to the segment of the content are within a specified tolerance value of sentiment value expressed by the user, wherein the sentiment values of the group of users are expressed within a defined period during the broadcast of the program, the group of users including the user;

program instructions to analyze a historical content of historical social media inputs from the plurality of users to extract an entity, the entity comprising a subject of the historical content, wherein the historical content is unrelated to the content;

program instructions to associate a time zone of a geographical location of the entity with the group of users;

program instructions to shift, by an amount of time on a program continuum timeline, a sentiment of the group of users expressed relative to the segment of the content such that the sentiment of the group of users aligns with a time when the segment was broadcast in the time zone;

program instructions to output a sentiment analysis report of the broadcast program, the report comprising the time-shifted sentiment of the group of users and a second time-shifted sentiment of a second group of users associated with a second time zone, the second time-shifted sentiment aligned with a second time when the segment was broadcast in the second time zone program instructions to determine that the group corresponds to a plurality of time zones because the analyzing the historical data extracts a plurality of entities corresponding to the plurality of time zones;

program instructions to fabricate event contents corresponding to a plurality of events, each event corresponding to a time zone in the plurality of time zones of the group, and each event evoking a different sentiment value from the users in the group;

program instructions to insert in a first broadcast occurring in a first time zone of the group a first event content corresponding to a first event from the plurality of events;

program instructions to insert in a second broadcast occurring in a second time zone of the group a second event content corresponding to a second event from the plurality of events;

program instructions to evaluate a new sentiment expressed in the social media inputs from the users in the group to determine that the new sentiment corresponds to a sentiment evoked by the first event;

program instructions to disambiguate, responsive to the evaluating, the group to correspond to only the first time zone.

14. The computer system of claim 13, further comprising:

program instructions to compute the sentiment of the group by applying a function to the sentiment values expressed by the users in the group relative to the segment of the content.

15. The computer system of claim 13, further comprising:

program instructions to form a second group of those users whose sentiment values expressed relative to a second segment of the content are within a specified tolerance value of each other, wherein the sentiment values of the group of users are expressed within a second defined period during the broadcast of the program;

program instructions to associate a second time zone of a second geographical location of a second entity with the second group;

program instructions to drop from consideration, responsive to the second time zone not being used in the sentiment analysis report of the broadcast program, a second sentiment of the second group expressed relative to the second segment, wherein the shifting is responsive to the time zone being used in the sentiment analysis report of the broadcast program.

16. The computer system of claim 13, wherein the entity comprises one of (i) an object known to be present at the geographical location and (ii) an event known to have occurred at the location.

17. The computer system of claim 13, further comprising:

program instructions to perform segmenting a content of a broadcast program into a plurality of segments, wherein a first segment comprises an amount of the content up to a point in the content that will have been broadcast in the time zone before broadcast in another time zone reaches the point in the content, the segment being the first segment.

* * * * *